United States Patent
Park (10) Patent No.: US 10,282,081 B2
(45) Date of Patent: May 7, 2019

(54) INPUT AND OUTPUT METHOD IN TOUCH SCREEN TERMINAL AND APPARATUS THEREFOR

(75) Inventor: Chan-Hyoung Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 238 days.

(21) Appl. No.: 13/479,387

(22) Filed: May 24, 2012

(65) Prior Publication Data

US 2013/0038544 A1 Feb. 14, 2013

(30) Foreign Application Priority Data

Aug. 10, 2011 (KR) .................. 10-2011-0079554

(51) Int. Cl.
*G06F 3/0488* (2013.01)
*G06F 3/041* (2006.01)

(52) U.S. Cl.
CPC ........ *G06F 3/0488* (2013.01); *G06F 3/04883* (2013.01); *G06F 3/04886* (2013.01); *G06F 2203/04804* (2013.01); *G06F 2203/04805* (2013.01)

(58) Field of Classification Search
CPC .. G06F 3/04886; G06F 3/0486; G06F 3/0416; G06F 1/1626
USPC .................................. 345/173–174
See application file for complete search history.

(56) References Cited

U.S. PATENT DOCUMENTS

| | | | |
|---|---|---|---|
| 8,769,431 B1* | 7/2014 | Prasad | G06F 3/048 715/764 |
| 8,902,248 B1* | 12/2014 | Bidarkar | G06F 17/246 345/619 |
| 2003/0117380 A1 | 6/2003 | Kanzaki | |
| 2005/0099400 A1 | 5/2005 | Lee | |
| 2006/0007178 A1 | 1/2006 | Davis | |

(Continued)

FOREIGN PATENT DOCUMENTS

| | | |
|---|---|---|
| CN | 101828162 A | 9/2010 |
| CN | 101882049 A | 11/2010 |

(Continued)

OTHER PUBLICATIONS

Prasad, Roy Varada; Method for Enabling a One Handed Operation of Large Form Factors Electronic Devices; Feb. 28, 2013; U.S. Appl. No. 61/771,035 pp. 1-26.*

(Continued)

*Primary Examiner* — Kwin Xie
(74) *Attorney, Agent, or Firm* — Cha & Reiter, LLC.

(57) ABSTRACT

A method and apparatus for further implementing a virtual screen which interworks with a screen of a terminal is provided. The method preferably includes determining a virtual screen which interworks with a screen of the terminal, providing the screen of the terminal and the determined virtual screen together, and displaying an operation according to touch input on the provided virtual screen on the virtual screen and the screen of the terminal, which interworks with the virtual screen. The virtual screen can be overlaid on a software screen and can further visually distinguish the virtual screen from the main screen.

26 Claims, 10 Drawing Sheets

(56) References Cited

U.S. PATENT DOCUMENTS

| | | | | |
|---|---|---|---|---|
| 2006/0125799 A1* | 6/2006 | Hillis | ............... | G06F 3/011 345/173 |
| 2007/0038955 A1* | 2/2007 | Nguyen | ............... | 715/804 |
| 2009/0006991 A1* | 1/2009 | Lindberg et al. | ............. | 715/763 |
| 2009/0013282 A1* | 1/2009 | Mercer | ............. | G06F 3/0481 715/788 |
| 2009/0027334 A1* | 1/2009 | Foulk | ............. | G06F 3/04886 345/173 |
| 2010/0062811 A1 | 3/2010 | Park et al. | | |
| 2011/0138328 A1 | 6/2011 | Ge | | |
| 2011/0169749 A1* | 7/2011 | Ganey et al. | ............. | 345/173 |
| 2011/0234746 A1* | 9/2011 | Saleh et al. | ............. | 348/14.03 |

FOREIGN PATENT DOCUMENTS

| | | |
|---|---|---|
| CN | 102117212 A | 7/2011 |
| CN | 102129312 A | 7/2011 |
| DE | 10016117 A1 | 3/2000 |
| EP | 1607847 A1 | 12/2005 |
| EP | 2 154 602 A1 | 2/2010 |
| JP | 2010-272036 A | 12/2010 |
| KR | 10-2010-0080303 A | 7/2010 |
| KR | 20110018589 A | 2/2011 |
| WO | 2008-070815 A1 | 6/2008 |

OTHER PUBLICATIONS

Chinese Search Report dated May 4, 2016.
Chinese Search Report dated Mar. 23, 2017.
European Search Report dated May 5, 2017.
Chinese Search Report, Dated: Jul. 19, 2017.
Amy K. Karlson and Benjamin B. Bederson, "ThumbSpace: Generalized One-Handed Input for Touchscreen-Based Mobile Devices", 15 pages.
Korean Trial Decision dated Aug. 29, 2018.
Korean Search Report dated Aug. 29, 2016.
Korean Search Report dated Oct. 13, 2016.
Chinese Search Report dated Oct. 19, 2016.

* cited by examiner

INPUT AND OUTPUT METHOD IN TOUCH SCREEN TERMINAL AND APPARATUS THEREFOR

CLAIM OF PRIORITY

This application claims the benefit under 35 U.S.C. § 119(a) from a Korean patent application filed in the Korean Intellectual Property Office on Aug. 10, 2011 and assigned Serial No. 10-2011-0079554, the entire disclosure of which is hereby incorporated by reference in its entirety.

BACKGROUND OF THE INVENTION

1. Field of the Invention

The present invention relates to an input and output apparatus of a touch screen terminal including but not limited to a portable terminal. More particularly, the present invention relates to a method and apparatus for implementing ways to interact with a touch screen terminal to make it easier for a user to manipulate a device with a touch screen.

2. Description of the Related Art

Portable terminals such as mobile terminals (cellular phones), electronic schedulers, and personal complex terminals have become necessities of modern society due to research and development of the electronic communication industry. In a short time such portable terminals have developed from mere voice communication devices into important means of information transmission of all types.

Conventionally, a touch screen format has been used in the construction of a portable terminal under a Graphic User Interface (GUI) to increase the convenience for a user who desires to input data, instructions, etc. Moreover, if the user touches text or image information which has previously displayed on the touch screen with his or her finger, the portable terminal ascertains what an item has been selected by the user according to a position of the touched screen and processes a command corresponding to the ascertained information.

Over the last two decades, the Internet has come into wide use for a multitude of applications. The portable terminal has provided various services based on a communication network to complement, and sometimes as part of the Internet. The touch screen provides convenience for using the services. However, the touch screen still provides inconvenience to some users who have difficulty in actually contacting the touch screen so that the portable terminal recognizes the object of the user's touch. For example, when the user holds the portable terminal with his or her one hand and must touch the screen of the touch screen using a thumb of the hand, it is difficult for him or her to touch a distant part on the touch screen.

SUMMARY OF THE INVENTION

An exemplary aspect of the present invention is to solve at least some of the above-mentioned problems and/or disadvantages and to provide at least the advantages described below. Accordingly, an exemplary aspect of the present invention is to provide an input and output method of configuring a virtual screen of a relatively small size, which interworks (i.e. interacts) with a screen of a touch screen terminal, and easily performing touch input and an apparatus therefor.

Another exemplary aspect of the present invention is to provide an input and output method of implementing software buttons mapped with hardware buttons installed out of a screen of the touch screen terminal on a virtual screen and an apparatus therefor.

In accordance with the present invention, an input and output method in a touch screen terminal is provided. The input and output method preferably comprises determining a virtual screen which interworks with a screen of the terminal, providing the screen of the terminal and the determined virtual screen together, and displaying an operation according to touch input on the provided virtual screen on the virtual screen and the screen of the terminal, which interworks with the virtual screen.

In accordance with the present invention, an input and output apparatus in a touch screen terminal is provided. The input and output apparatus preferably comprises an input unit for input, a display unit for output, a storage unit for storing a data, and a controller for controlling an overall operation, wherein the controller determines/configures an arrangement of display of the virtual screen, which interworks with a main screen of the terminal, and outputs the screen of the terminal and the determined virtual screen together on the display unit, and controls the display unit to load an operation according to touch input from the storage unit when the touch input on the virtual screen is output from the input unit and display the loaded operation on the virtual screen and the screen of the terminal, which interworks with the virtual screen. The display of the virtual screen and main screen can be simultaneous, and may be overlapping.

The input and output method may further include determining by a controller a virtual screen which interworks with a main screen of the terminal; providing by the controller an output of the main screen of the terminal and the determined virtual screen together on a same display unit; and displaying an operation according to touch input sensed on the virtual screen, on the virtual screen, wherein a viewable area of the virtual screen and the main screen of the terminal are proportional.

BRIEF DESCRIPTION OF THE DRAWINGS

The above and other exemplary aspects, features and advantages of certain exemplary embodiments of the INPUT AND OUTPUT METHOD IN A TOUCH SCREEN TERMINAL AND APPARATUS THEREFORE according to the present invention will become more apparent to a person or ordinary skill in the art from the following detailed description taken in conjunction with the accompanying drawings, in which:

FIGS. 3(*a*) to 3(*c*) are screens illustrating an exemplary process of an input and output method in a touch screen terminal according to an embodiment of the present invention;

FIGS. 6(*a*) and 6(*b*) are screens illustrating an exemplary process of hiding or showing a virtual screen again according to an embodiment of the present invention;

DETAILED DESCRIPTION

Exemplary embodiments of the present invention will now be described herein below with reference to the accompanying drawings. In the following description, well-known functions or constructions may not be described in detail when they would obscure appreciation of the present invention by a person of ordinary skill in the art with unnecessary detail of the well-known functions and structures. Also, the terms used herein are defined according to the functions of the present invention as would be understood by a person of ordinary skill in the art. Thus, the terms may vary depending on user's or operator's intension and usage. That is, the terms used herein must be understood based on the descriptions made herein in view of the ordinary level of skill in the art.

The present invention described hereinafter provides an input and output method of a touch screen terminal and an apparatus therefor. More particularly, the prevent invention provides a method and apparatus for further implementing a virtual screen (which in some embodiments constitutes a sub-screen or division of the main or standard screen (see 320 FIG. 3C) and which looks like a screen in its entirety only small than the main screen and the virtual screen interworks with a screen of a terminal. Although a touch range of the virtual screen is narrower than that of the screen of the terminal because the virtual screen is smaller than that of the screen of the terminal, it is easy to perform touch input for generating a corresponding operation of the terminal.

Figure 1:
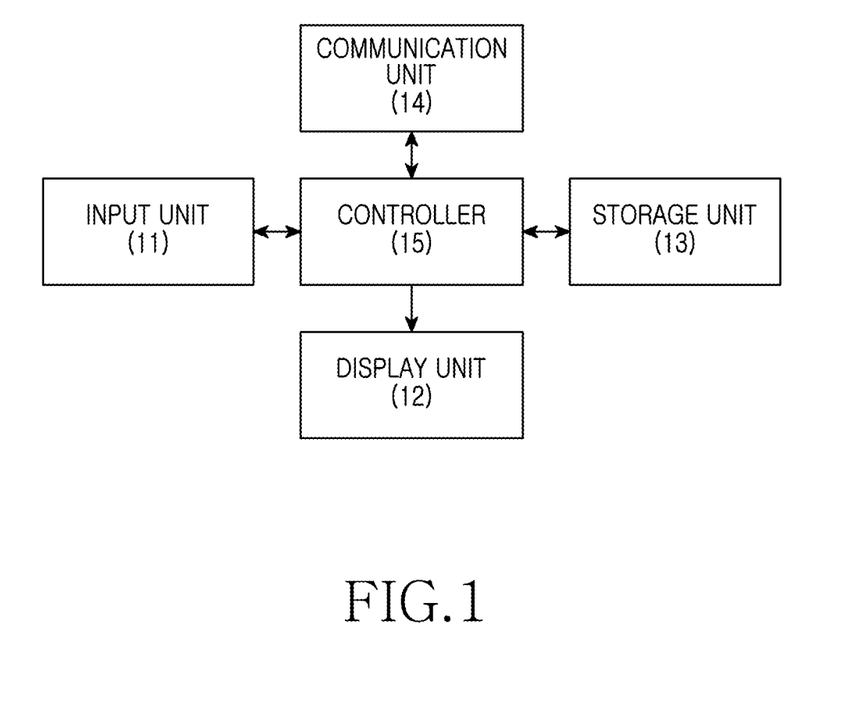
FIG. 1 is a block diagram of a touch screen terminal according to one embodiment of the present invention.

FIG. 1 is a block diagram of a touch screen terminal according to one exemplary embodiment of the present invention.

Referring now to FIG. 1, the touch screen terminal according to an exemplary embodiment of the present invention preferably includes an input unit 11 for input, a display unit 12 for output, a storage unit 13 for storing a data, a communication unit 14 for communication, and a controller 15 for controlling an overall operation.

The input unit 11 outputs an input signal according to a touch of a user and the other input signals to the controller 15. The display unit 12 receives and displays a display data corresponding to the input signal according to control of the controller 15. User touch can be on a keypad, icon, virtual keypad, etc.

The storage unit 13, which comprises a non-transitory machine readable medium, stores a certain program for controlling an overall operation of the touch screen terminal and various data input and output when a control operation of the touch screen terminal is performed.

The communication unit 14 performs wire or wireless communication under control of the controller 15.

The controller 15, which comprises a processor or microprocessor, controls an overall operation of the touch screen terminal.

Hereinafter, an input and output method according to one embodiment of the present invention in the controller 15 will be described in detail with reference to drawings.

Figure 2:
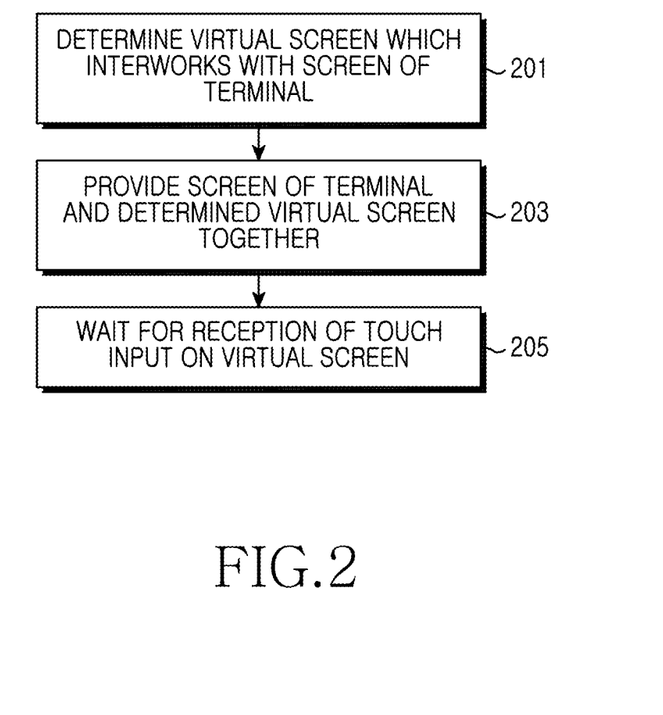
FIG. 2 is a flowchart illustrating a an exemplary process of an input and output method in a portable terminal according to an embodiment of the present invention.

FIG. 2 is a flowchart illustrating an exemplary process of an input and output method in a touch screen terminal according to an exemplary embodiment of the present invention.

Referring now to FIG. 2, the controller 15 of FIG. 1 determines a virtual screen which interworks with a screen of the terminal in step 201. The controller verifies contents displayed on the screen of the terminal and includes the verified contents on a virtual screen to be displayed later. The controller 15 may monitor video output signals in the screen of the terminal and verify the contents by monitoring video output signals. The controller 15 overlays the virtual screen on the screen of the terminal, and displays the verified contents on the virtual screen. The contents includes shortcut such as icons, widgets, etc. In order to perform the process of determining this virtual screen, the controller 15 may have previously performed a process of sensing input for determining the virtual screen. This input may be sensing touch according to a touch of a corresponding icon. The input may be sensing pushing of a corresponding button installed on a screen of the terminal or a touch event may be sensed according to a specific type like a double click.

The controller 15 provides output of the screen of the terminal and the determined virtual screen together for display in step 203. The controller 15 classifies a first layer of the display and a second layer positioned on the first layer of the display. The controller 15 may apply the screen (i.e. main screen) of the terminal to the first layer and may apply the virtual screen to the second layer. In accordance with this configuration, the main screen of the terminal is positioned as a background of the virtual screen.

The controller 15 may semi-transparently process operation of the virtual screen according to corresponding shown on the main screen of the terminal without hiding a display of the may screen of the terminal. In addition, the controller 15 may determine a position and a size of the virtual screen according to corresponding input. A button for generating an operation for adjusting a display type of the virtual screen may be configured on the virtual screen.

It is also within the spirit and scope of the claimed invention that a portion of what was previously being displayed on the main screen may be hidden by the display of the virtual screen, or alternatively, the display of the main screen might shift according to its newly reduced area. The virtual screen is smaller than the screen of the terminal, and typically overlaid on a portion of the screen (i.e. main or regular screen) of the terminal. Accordingly, because the chance of entering an erroneous input is greater with a smaller screen, the controller 15 may enlarge and show a touch point in an enlarged or magnified form to facilitate proper placement of the touch. For example, the controller 15 controls the display unit 12 to enlarge contents displayed on a shape of a predetermined size, which starts the touch point on the virtual screen, and display the enlarged contents on the virtual screen or the screen of the terminal. The shape may be a circle, a quadrangle, etc., and the predetermined size should be visibly larger than the original size to make it easier to touch the correct area. In addition, other types of visual distinguishment (color, flashing, background, font, etc., can be used.

Also, the controller 15 optionally provides software buttons (i.e. virtual buttons) on the virtual screen mapped with at least one or more hardware buttons installed outside of the viewable area of the main screen of the terminal. These hardware buttons may be a volume adjustment button, a home button, etc.

In addition, the controller 15 may provide a button about an operation for hiding or showing the virtual screen again and a button about an operation for ending the virtual screen which can be displayed on the virtual screen.

The controller 15 preferably determines that only a touch input on the virtual screen is valid. Also, the virtual screen provides touch input of all types permitted when only the screen of the terminal is displayed.

In step 205, the controller 15 waits for reception of touch input on the virtual screen. Thereafter, the controller 15 controls the display unit 12 to receive the touch input on the virtual screen and display a corresponding operation according to the reception of the touch input on the virtual screen. The controller 15 controls the display unit 12 to also display the same operation on the screen of the terminal, which interworks with the virtual screen.

Figure 3A:
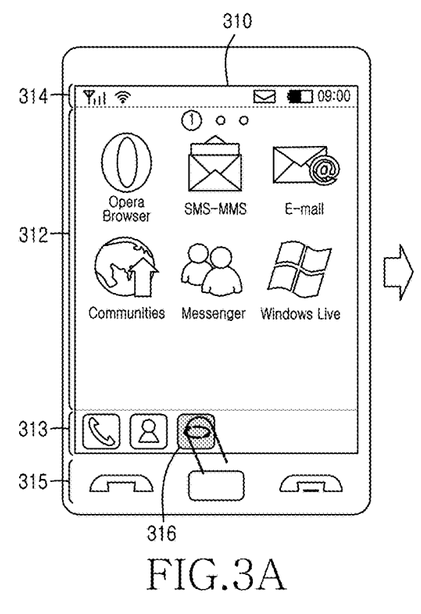
Figure 3B:
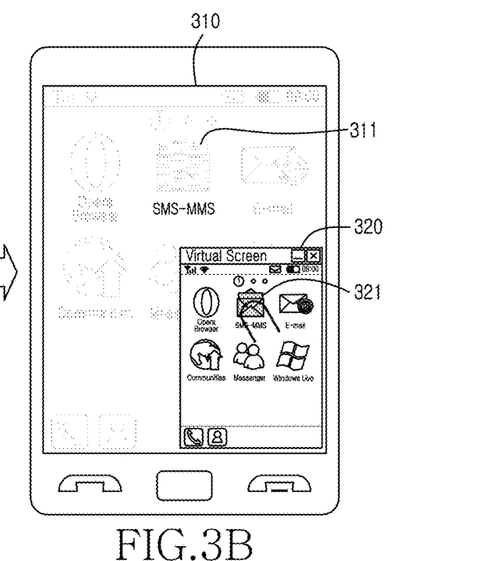
Figure 3C:
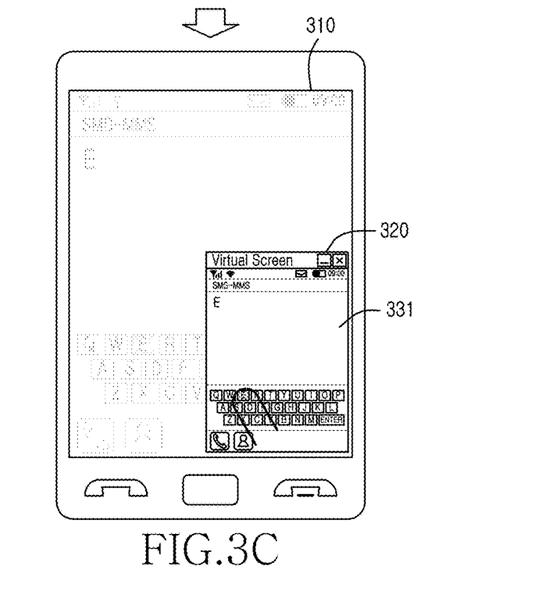

FIGS. 3(a) to 3(c) are screens illustrating an exemplary process of an input and output method in a touch screen terminal according to an exemplary embodiment of the present invention.

Referring now to FIG. 3(a), a screen 310 (for example, a main screen) of the terminal displays contents such as icons 312 corresponding to a plurality of application programs, buttons 313 corresponding to corresponding operations, and various information (e.g., the remaining capacity of a battery, a date, and time, etc.). In addition, the terminal further includes hardware buttons 315 about corresponding operations. If a corresponding button 316 is pushed in FIG. 3(a), then as shown in FIG. 3(b), a virtual screen 320 is determined and provided together with the screen 310 of the terminal.

Referring now to FIG. 3(b), the terminal displays the virtual screen 320 according to the process of FIG. 2. The virtual screen 320 interworks with the screen 310 of the terminal Contents displayed on the screen 310 of the terminal, shown in FIG. 3(a), are displayed on the virtual screen 320 as shown in FIG. 3(b). If a corresponding icon 321 of the virtual screen 320 is touched, the terminal shows that an icon 311 mapped with the corresponding icon 321 is selected on the screen 310 of the terminal.

Referring now to FIG. 3(c), if the corresponding icon 321 of the virtual screen 320 is touched, an operation of an application program according to the corresponding icon 321 is displayed on the virtual screen 320. In addition, the operation of the application is also displayed on the screen 310 of the terminal.

Figure 4:
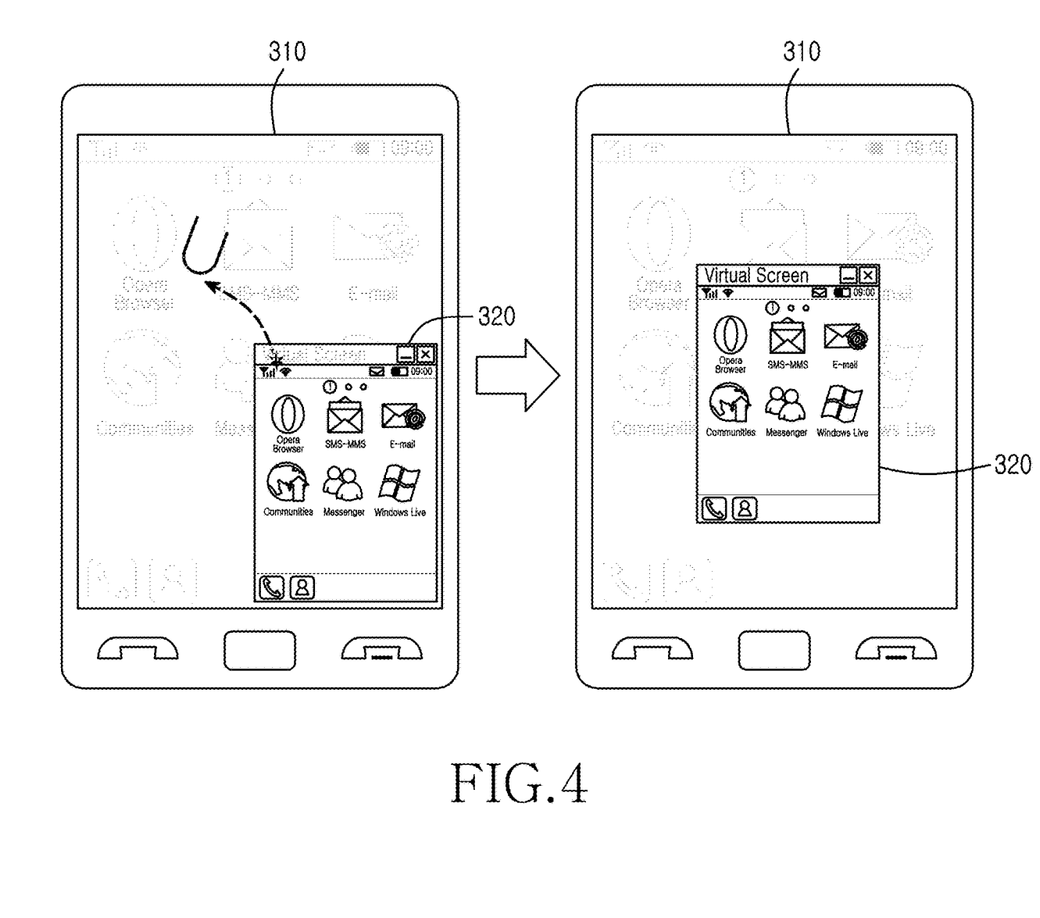
FIG. 4 is a screen illustrating an exemplary process of determining a position of a virtual screen according to an embodiment of the present invention.

FIG. 4 is a screen illustrating a process of determining a position of a virtual screen according to an exemplary embodiment of the present invention.

Referring now to FIG. 4, if input for operating movement of a virtual screen 320 is generated, the virtual screen 320 is in a movable state. A user of a terminal may move and dispose the virtual screen 320.

Figure 5:
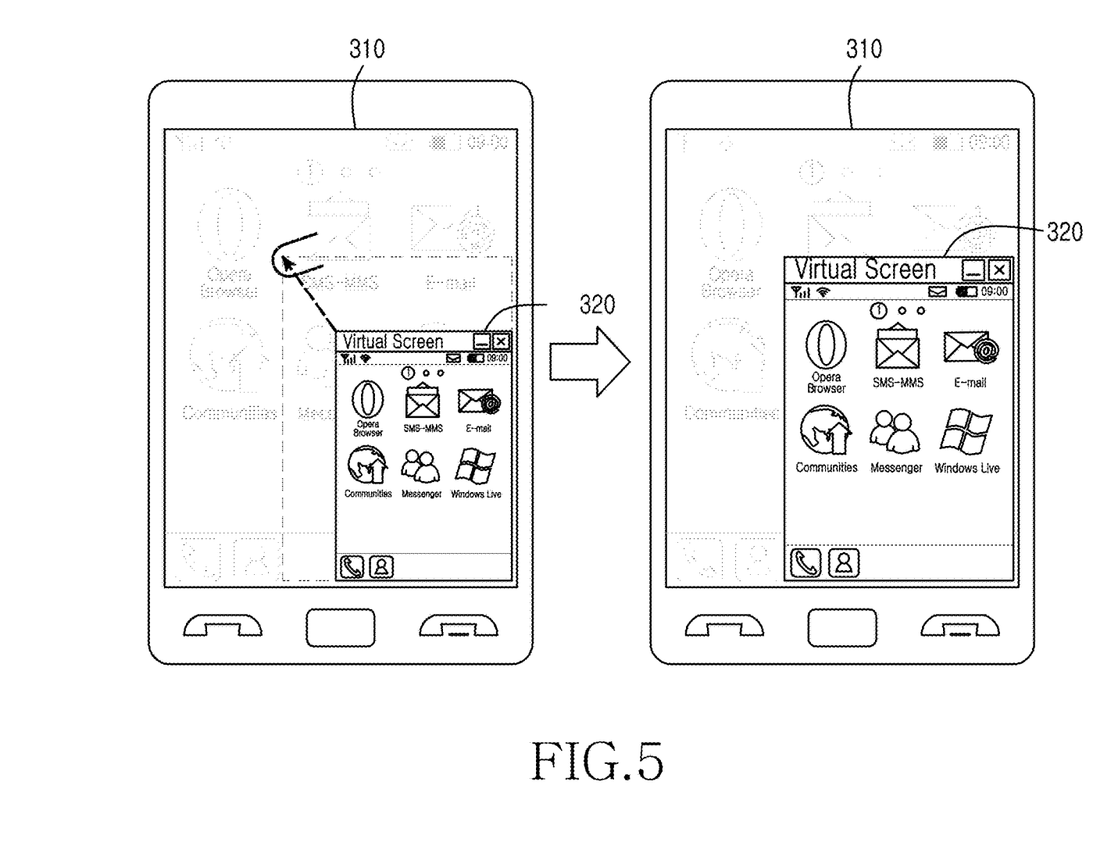
FIG. 5 is a screen illustrating an exemplary process of adjusting a size of a virtual screen according to an embodiment of the present invention.

FIG. 5 is a screen illustrating a process of adjusting a size of a virtual screen according to an exemplary embodiment of the present invention.

Referring now to FIG. 5, if an input for adjusting a size of a virtual screen 320 is generated, the virtual screen 320 is in an adjustable state. A user of a terminal may adjust the size of the virtual screen 320.

Figure 6A:
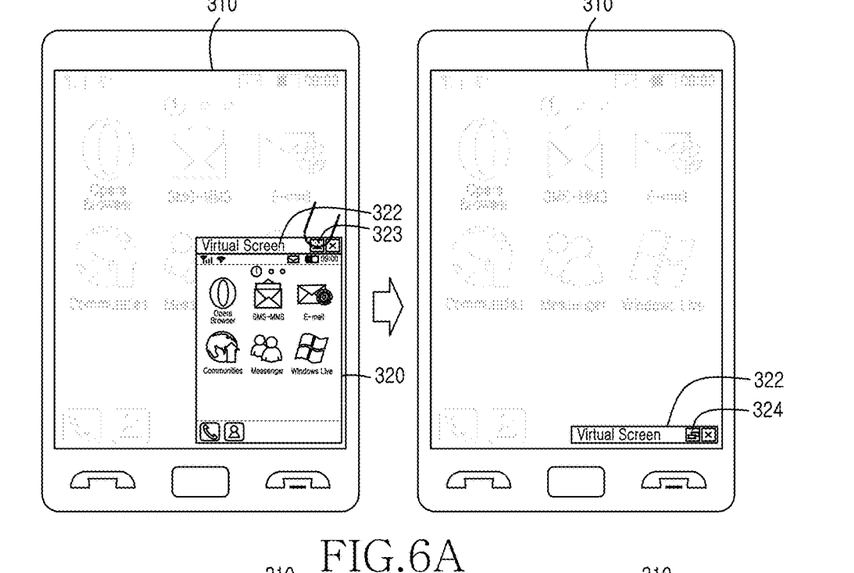
Figure 6B:
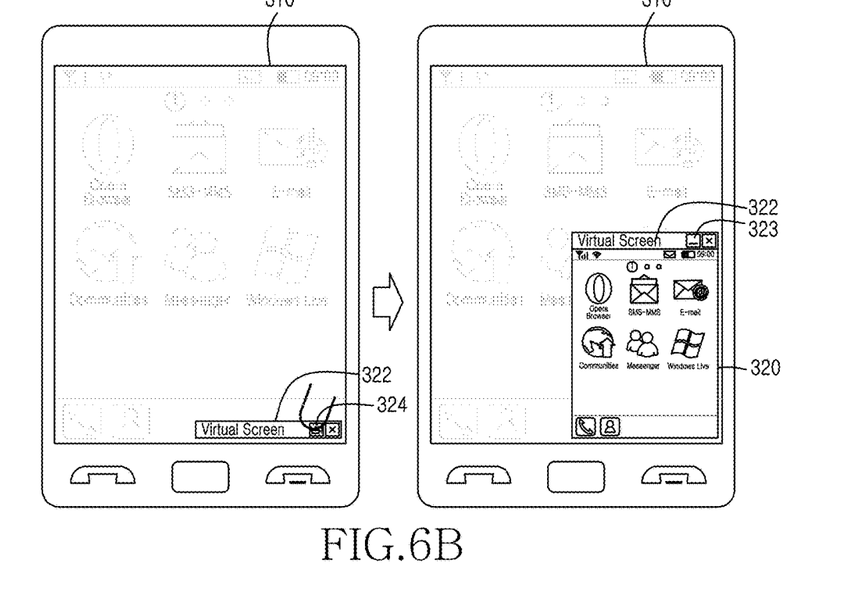

FIGS. 6(a) and 6(b) are screens illustrating a process of hiding or showing a virtual screen again according to an exemplary embodiment of the present invention.

A virtual screen 320 according to one exemplary embodiment of the present invention provides a display line 322. The display line 322 provides a first button 323 corresponding to an operation for hiding the virtual screen 320 and a second button 324 corresponding to an operation for showing the hidden virtual screen again.

Referring now to FIG. 6(a), the virtual screen 320 is shown and the first button 323 is provided on the display line 322. If a user touches the first button 323, only the display line 322 remains and the virtual screen 320 is hidden. When the virtual screen 320 is hidden, the first button 323 is replaced and the second button 324 is provided on the display line 322.

Referring to FIG. 6(b), if the user touches the second button 324 of the display line 322, the hidden virtual screen 320 is shown again. The second button 324 is replaced and the first button 323 is provided on the display line 322.

Figure 7:
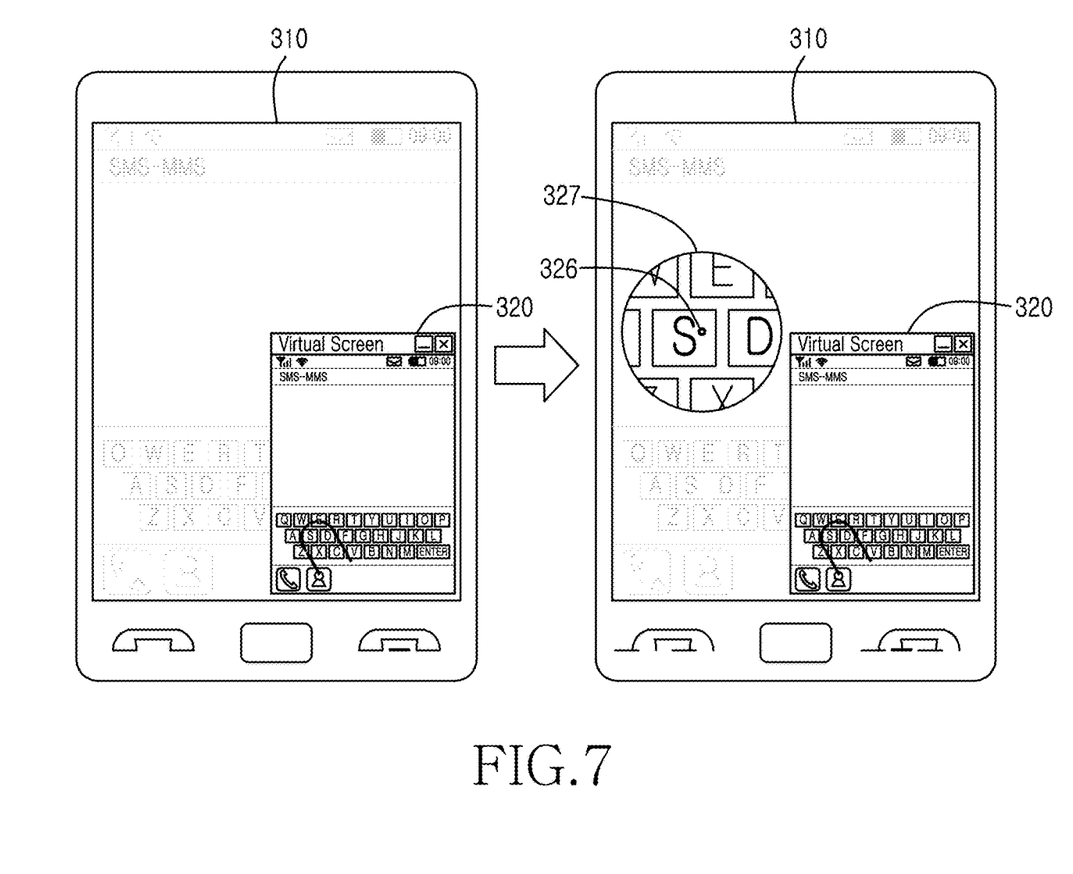
FIG. 7 is a screen illustrating an exemplary process of expanding and showing contents of a virtual screen according to an embodiment of the present invention.

FIG. 7 is a screen illustrating a process of enlarging and showing contents of a virtual screen according to an exemplary embodiment of the present invention.

Referring now to FIG. 7, the controller 15 of FIG. 1 enlarges and displays contents displayed on a shape 327 of a predetermined size, which starts a point 326 touched on a virtual screen 320 according to exemplary embodiment of the present invention, by predetermined magnification and primarily shows the enlarged contents to a user. Accordingly, the user may verify whether or not they are touching the virtual screen 320 correctly. For example, if a touch continues during a threshold time or more, as described above, the controller 15 enlarges and shows a corresponding part which starts a touched point. If a finger of the user is moved in a state where the touch continues, the controller 15 moves and shows a touch point according to the movement of the finger. Finally, if the touch is released, the controller 15 determines touch input corresponding to the released point.

Figure 8:
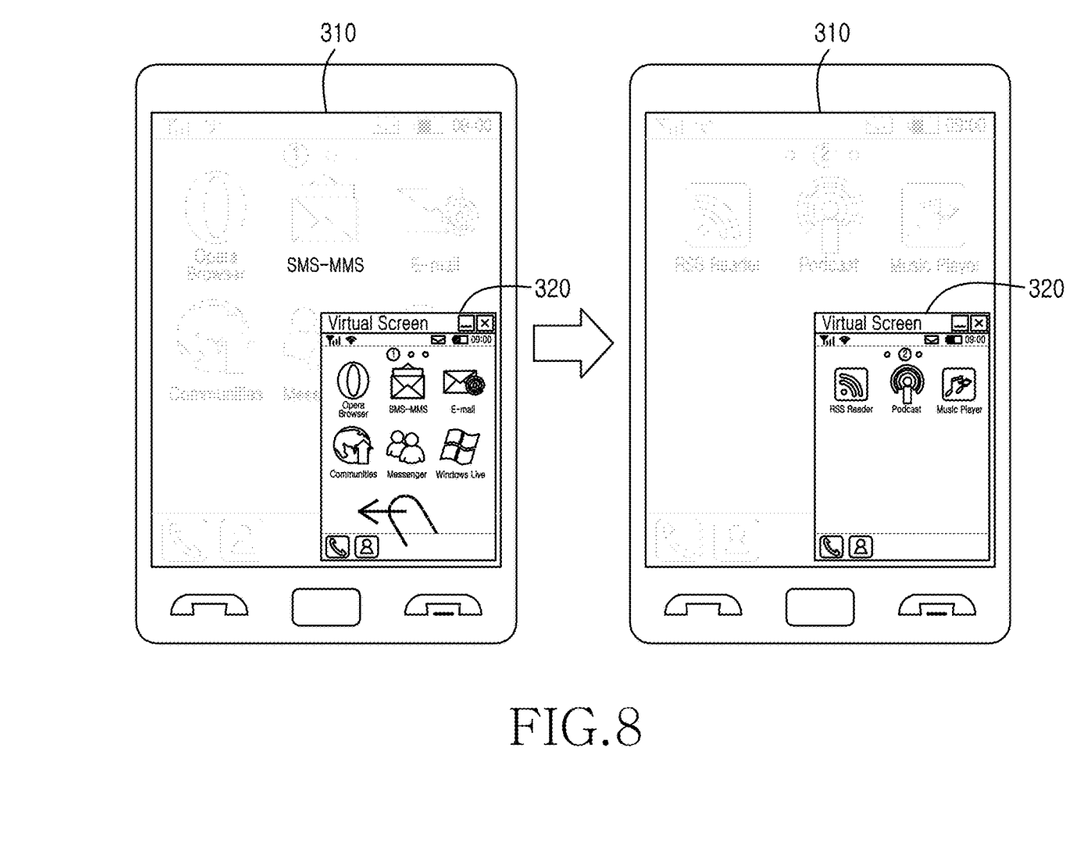
FIG. 8 is a screen illustrating an exemplary process of changing a page on a virtual according to an embodiment of the present invention.

FIG. 8 is a screen illustrating a process of changing a page on a virtual screen according to an exemplary embodiment of the present invention.

Referring now to FIG. 8, if a touch input for changing a page on a virtual screen 320 is generated, the controller 15 of FIG. 1 displays a previous or next page on the virtual screen 320. A screen 310 of the terminal also displays the previous or next page. The touch input for changing the page may be defined as, for example, a flicking touch.

Figure 9:
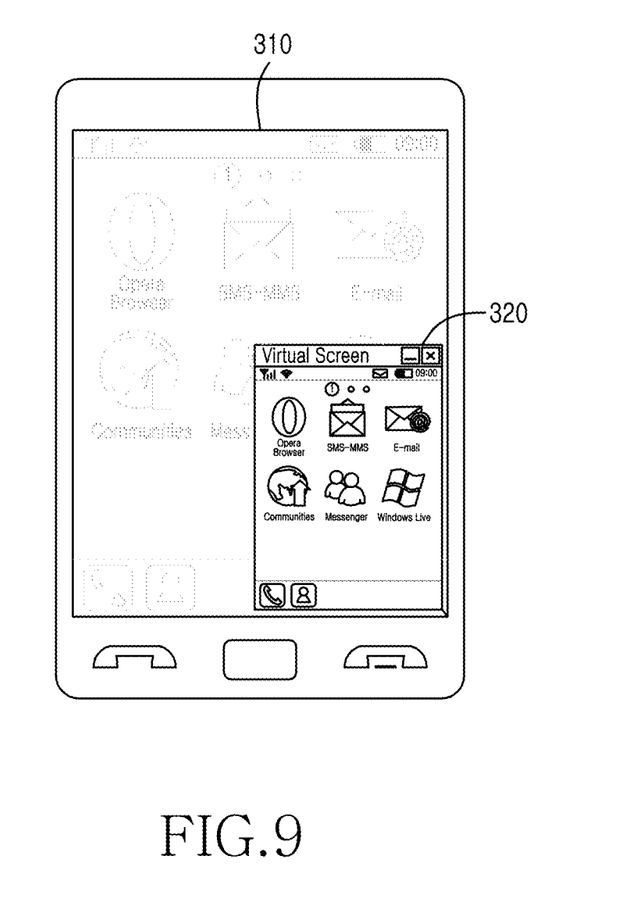
FIG. 9 is a screen illustrating an exemplary process of providing a virtual screen and a screen of a terminal together according to an embodiment of the present invention.

FIG. 9 is a screen illustrating a process of providing a virtual screen and a screen of a terminal together according to exemplary embodiment of the present invention.

Referring now to FIG. 9, a virtual screen 320 is semi-transparently processed and a screen 310 of the terminal is shown without being hidden.

Figure 10:
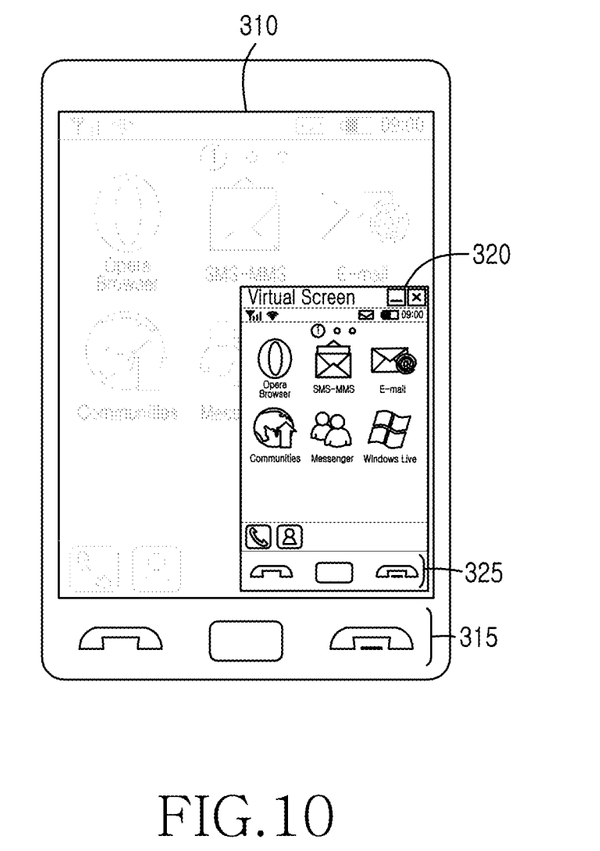
FIG. 10 is a virtual screen according to an exemplary embodiment of the present invention.

FIG. 10 is a virtual screen according to an exemplary embodiment of the present invention.

Referring now to FIG. 10, a virtual screen 320 may further provide software buttons 325 mapped with at least one or more hardware buttons 315 installed out of a screen 310 of a terminal.

In conclusion, an input and output method in a touch screen terminal according to an exemplary embodiment of the present invention implements a virtual screen of a smaller size than an entirety of the display, which interworks with a screen of the terminal, and easily performs touch input in a relatively small touch range.

While the present invention has been particularly shown and described with reference to exemplary embodiments thereof, it will be understood by those skilled in the art that various changes in form and details may be made therein without departing from the spirit and scope of the present invention as defined by the appended claims. When the specification refers to the virtual screen 320 being smaller than the main screen 310, and the drawings show the virtually screen being approximately ⅓rd to ¼ the size of the main screen, the present claims are not limited to this particular reduction, as the virtual screen could be smaller or larger than the remaining visible portion of the main screen of the display.

The above-described methods according to the present invention can be implemented in hardware, firmware or as software or computer code that can be stored in a recording medium such as a CD ROM, an RAM, a floppy disk, a hard disk, thumbnail drive or a magneto-optical disk or computer code downloaded over a network originally stored on a remote recording medium or a non-transitory machine readable medium and to be stored on a local non-transitory recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

What is claimed is:

1. A method in an electronic device, the method comprising:
    displaying a main screen in a touch display of the electronic device wherein the main screen displays a page of a sequence of pages comprising a next page following the page in the sequence of pages;
    in response to a first touch input sensed on the main screen while the main screen is displaying the page, displaying, in a lower corner of the main screen, a virtual screen that is smaller than the main screen over the main screen wherein a region of the main screen except a region of the virtual screen is dimmed, and wherein the virtual screen is a smaller version of the main screen that reduces the main screen proportionately between a vertical axis and a horizontal axis, wherein the virtual screen displays a smaller version of the page;
    in response to a second touch input sensed on the virtual screen, adjusting a size of the virtual screen proportionately between the vertical axis and the horizontal axis, wherein the second touch input comprises a touch on a corner of the virtual screen followed by a touch drag of the touch on the touch display; and
    in response to a swiping gesture on the virtual screen, displaying the next page in the main screen and a smaller version of the next page in the virtual screen, wherein a touch input on the virtual screen is responsive, and a touch input sensed on the dimmed region of the main screen is nonresponsive while displaying the virtual screen.

2. The method of claim 1, wherein displaying the virtual screen comprises classifying a first layer and a second layer positioned on the first layer of a visual area of the touch display, applying the main screen to the first layer, and applying the virtual screen to the second layer.

3. The method of claim 1, further comprising adjusting a position of the virtual screen in response to a fourth touch input sensed on the virtual screen.

4. The method of claim 1, wherein displaying the virtual screen comprises displaying the virtual screen opaquely or semi-transparently.

5. The method of claim 1, further comprising enlarging, by a predetermined magnification, content displayed within a shape of a predetermined size such that the content corresponds to a touch point on the virtual screen; and displaying the enlarged content via the touch display.

6. The method of claim 1, further comprising determining whether a touch input on the virtual screen is a valid input.

7. The method of claim 6, further comprising detecting at least one type of input through the virtual screen that is also detectable through the main screen.

8. The method of claim 1, further comprising displaying one or more virtual buttons on the virtual screen that are mapped with one or more hardware buttons installed out of a viewable area of the main screen of the electronic device.

9. The method of claim 1, further comprising displaying a button associated with an operation for hiding or showing the virtual screen and a button associated with an operation for ending display of the virtual screen.

10. An electronic device, comprising:
    a touch display; and
    a controller to control operations of:
    displaying a main screen on the touch display wherein the main screen displays a page of a sequence of pages comprising a next page following the page in the sequence of pages;
    in response to a first touch input sensed on the main screen while the main screen is displaying the page, displaying, in a lower corner of the main screen, a virtual screen that is smaller than the main screen over the main screen wherein a region of the main screen except a region of the virtual screen is dimmed, and wherein the virtual screen is a smaller version of the main screen that reduces the main screen proportionately between a vertical axis and a horizontal axis, wherein the virtual screen displays a smaller version of the page;
    in response to a second touch input sensed on the virtual screen, adjusting a size of the virtual screen proportionately between the vertical axis and the horizontal axis, wherein the second touch input comprises a touch on a corner of the virtual screen followed by a touch drag of the touch on the touch display; and
    in response to a swiping gesture on the virtual screen, displaying the next page in the main screen and a smaller version of the next page in the virtual screen, wherein a touch input on the virtual screen is responsive, and a touch input sensed on the dimmed region of the main screen is nonresponsive while displaying the virtual screen.

11. The electronic device of claim 10, wherein the controller classifies a first layer and a second layer positioned on the first layer of a visual area of the touch display, applies the main screen to the first layer, and applies the virtual screen to the second layer.

12. The electronic device of claim 10, wherein the controller controls a position of the virtual screen in response to a fourth touch input sensed on the virtual screen.

13. The electronic device of claim 10, wherein the controller controls the touch display to display the virtual screen opaquely or semi-transparently.

14. The electronic device of claim 10, wherein the controller controls the touch display to enlarge content displayed on a shape of a predetermined size, which activates a touch point on the virtual screen, by predetermined magnification and displays the enlarged content via the touch display.

15. The electronic device of claim 10, wherein the controller determines whether a touch input on the virtual screen is a valid input.

16. The electronic device of claim 15, wherein the controller to detect at least one type of input through the virtual screen that is also detectable through the main screen.

17. The electronic device of claim 10, wherein the controller controls the touch display to display one or more virtual buttons on the virtual screen mapped with one or more hardware buttons installed outside the main screen of the electronic device.

18. The electronic device of claim 10, wherein the controller controls the touch display to display a button associated with an operation for hiding or showing the virtual screen and a button on the virtual screen associated with an operation for terminating display of the virtual screen.

19. The method of claim 1, further comprising displaying a home button on the virtual screen.

20. The electronic device of claim 10, wherein the controller controls the touch display to display a home button on the virtual screen.

21. The method of claim 1, further comprising displaying an icon on the virtual screen for initiating a phone call and displaying an icon on the virtual screen for ending a phone call.

22. The electronic device of claim 10, wherein the controller controls the touch display to:
display an icon on the virtual screen for initiating a phone call; and
display an icon on the virtual screen for ending a phone call.

23. The method of claim 1, further comprising displaying on the virtual screen a status indicator.

24. The electronic device of claim 10, wherein the controller controls the touch display to display a status indicator on the virtual screen.

25. The method of claim 8, wherein displaying one or more virtual buttons comprises displaying a plurality of virtual buttons in an arrangement matching a corresponding arrangement of hardware buttons on the electronic device for the same respective functions.

26. A method in an electronic device, the method comprising:
displaying a main screen in a touch display of the electronic device, wherein the main screen displays a page of a sequence of pages comprising a next page following the page in the sequence of pages;
in response to a first touch input sensed on the main screen while the main screen is displaying the page, displaying, in a lower corner of the main screen, a virtual screen that is smaller than the main screen over the main screen wherein a region of the main screen except a region of the virtual screen is dimmed, and wherein the virtual screen is a smaller version of the main screen that reduces the main screen proportionately between a vertical axis and a horizontal axis, wherein the virtual screen displays a smaller version of the page; and
in response to a swiping gesture on the virtual screen, displaying the next page in the main screen and a smaller version of the next page in the virtual screen.

* * * * *